United States Patent [19]

Ikeda et al.

[11] Patent Number: 4,618,921
[45] Date of Patent: Oct. 21, 1986

[54] POWER SUPPLY SYSTEM AND A STARTING METHOD THEREOF

[75] Inventors: Hiroshi Ikeda; Osamu Higa, Fuchu, Japan

[73] Assignee: Kabushiki Kaisha Toshiba, Kawasaki, Japan

[21] Appl. No.: 765,127

[22] Filed: Aug. 13, 1985

[30] Foreign Application Priority Data

Aug. 24, 1984 [JP] Japan .............................. 59-176254

[51] Int. Cl.$^4$ ...................... H02P 13/26; G05F 1/455
[52] U.S. Cl. ........................................ 363/49; 363/88; 363/128
[58] Field of Search ...................... 363/49, 85, 87–88, 363/128; 323/901

[56] References Cited

U.S. PATENT DOCUMENTS

| | | | |
|---|---|---|---|
| 3,421,070 | 1/1969 | Ettinger | 363/49 |
| 3,458,796 | 7/1969 | Cassady | 363/49 |
| 4,320,273 | 3/1982 | Kiuchi | 363/49 X |
| 4,468,724 | 8/1984 | Omae et al. | 363/128 X |

OTHER PUBLICATIONS

"Control and Protection of Thyristor Convertors for JT-60 Poloidal Field Coils", R. Shimada et al.; Dec. 1983

Primary Examiner—Peter S. Wong
Attorney, Agent, or Firm—Oblon, Fisher, Spivak, McClelland & Maier

[57] ABSTRACT

A power supply system for supplying a load current to a load including a serially connected circuit of a controlled rectifier, a switch and a capacitor. A diode is connected in parallel with the capacitor or with a serially connected circuit of the switch and the capacitor and a control circuit. Which controls the controlled rectifier such that when a first voltage between the capacitor is larger than or equal to a specified voltage the controlled rectifier is operated as bypass pair mode and when the first voltage is below the specified voltage the controlled rectifier is operated as current control mode. A method for starting a power supply system is also disclosed.

11 Claims, 5 Drawing Figures

POWER SUPPLY SYSTEM AND A STARTING METHOD THEREOF

BACKGROUND OF THE INVENTION

1. Field of the Invention

This invention relates to a power supply system and a starting method thereof. More particularly this invention relates to a power supply system in which a large amount of current is required to be controlled with a quick response time and a starting method thereof.

2. Discussion of Background

As an example of a conventional power supply system, a power supply system for a coil to be used for nuclear fusion where a large amount of current is required will be described below.

When generating plasma for nuclear fusion, it is required to control with quick response a current of a coil for use in plasma position control so as to control a position of a plasma. To meet this requirement, there should be provided a power supply system capable of controlling a large amount of current with a high voltage.

Hitherto, for such a power supply system, there has been used a power supply system provided with a controlled rectifier connected in series to a diode rectifier as shown in, for example Japanese Patent Disclosure No. 55-125080. In the conventional power supply system, when increasing the plasma current to several tens of kA, a DC voltage of, for example about 20 kv is generated, and when the plasma current becomes constant and the coil current for plasma position control also becomes constant, an AC side interrupter for a diode rectifier is opened, and thereafter the coil current for plasma position control is controlled by a controlled rectifier rated at several kv.

However, the conventional power supply system has the disadvantage that when the AC side interrupter for the diode rectifier is opened, a drastically large load fluctuation is generated if observed from the AC power system, resulting in an extremely large disturbance on the AC bus line. In addition, a diode rectifier with ratings of 10 kv or more and several tens kA becomes necessary and this results in high cost. Particularly in a medium scale nuclear fusion system, when there is no motor-generator on the AC side and AC power is directly fed to the power supply system from a commercial power source, it is not allowed to produce a large load fluctuation at one time. So that there has been necessiated such a power supply system in which all of the current control is performed only by a large capacity controlled rectifier, or in which several diode rectifier units are connected in series to a controlled rectifier so that a plurality of AC interrupters for a plurality of diode rectifiers are sequentially opened, which causes the power supply system to be extremely expensive.

SUMMARY OF THE INVENTION

Accordingly, one object of this invention is to provide a highly economical power supply system which can supply a large current to a load with a quick response time and without any disturbance on the AC bus line.

Another object of this invention is to provide a method for starting a power supply system in which the power supply system can supply a large current to a load with a quick response time and without any disturbance on the AC bus line.

These and other objects of this invention are achieved by providing a power supply system for supplying a load current to a load including, a controlled rectifier having input and output terminals for receiving an AC voltage at the input terminals and for performing bypass pair operation and current control operation based on a control signal to supply the load current from the output terminals, and a first circuit having two terminals for charging a first voltage between the two terminals and a switch where in the first circuit, the switch and the output terminals of the controlled rectifier are connected in series. The power supply system further includes a second circuit connected in parallel with the first circuit or with a serially connected circuit of the first circuit and the switch, for passing the load current therethrough in one direction. The power supply system also includes a control circuit which produces an ON signal based on a start-up command, and also produces, based on the AC voltage and the start-up command, a first control signal for bypass pair operation of the control rectifier when the first voltage is larger than or equal to a specified voltage, and a second control signal for current control operation of the controlled rectifier when the first voltage is below the specified voltage. The control circuit outputs the first control signal and the second control signal sequentially as the control signal. In the power supply system, the switch is closed based on the ON signal from the control circuit, and the second circuit passes the load current therethrough when the first voltage is a predetermined value.

According to this invention there is further provided a method for starting a power supply system as described above, including the steps of charging the first circuit initially by a specified charging voltage between the two terminals, and opening the switch initially. The method further includes the steps of starting the controlled rectifier then in bypass pair operation mode, and closing the switch then thereby to cause the first circuit to discharge. The method also includes the steps of releasing the controlled rectifier from bypass pair operation mode and starting the controlled rectifier in current control operation mode when the first voltage between the two terminals of the first circuit becomes below the specified voltage, and commutating the load current from the first circuit to the second circuit when the first voltage is zero.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
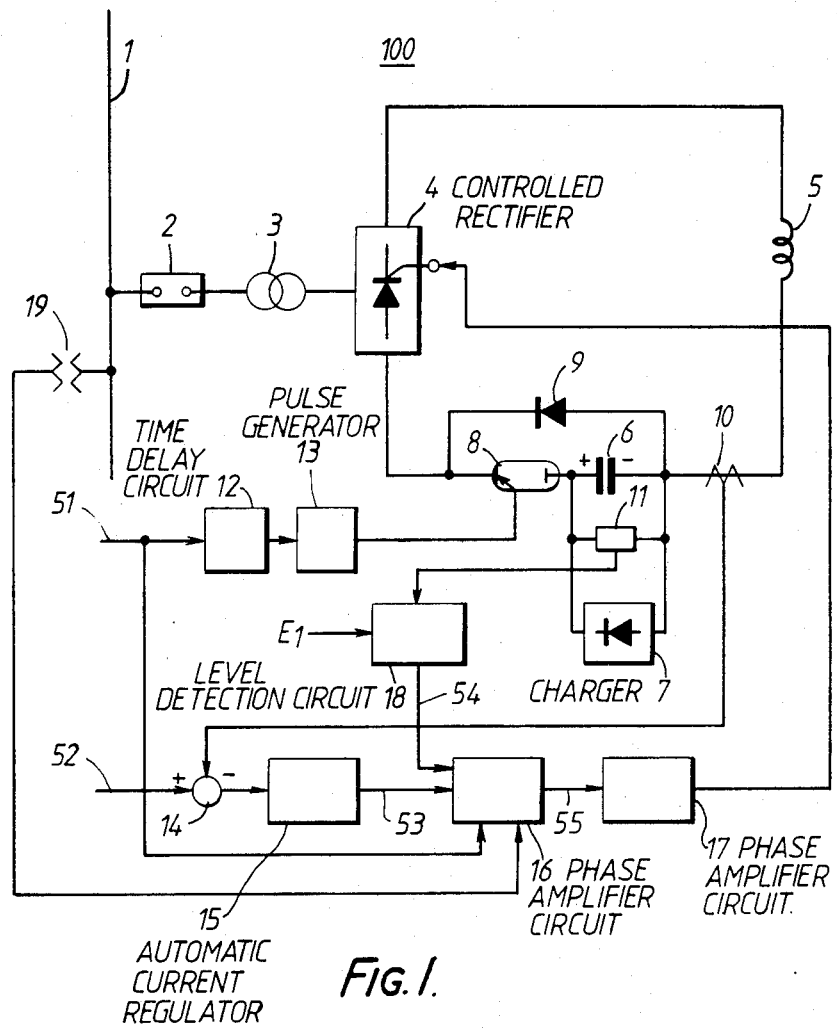
FIG. 1 is a block diagram illustrating a power supply system according to a preferred embodiment of this invention.

Referring now to the drawing, wherein like reference numerals designate identical or corresponding parts throughout the several views, and more particularly to FIG. 1 thereof, reference numeral 100 designates a power supply system, according to a preferred embodiment of this invention, for a coil to be used for nuclear fusion.

In FIG. 1, reference numeral 1 designates an AC bus line, 2 designates an AC interrupter and 3 designates a rectifier transformer that converts a voltage of the AC bus line 2 into a suitable AC voltage. Reference numeral 4 designates a controlled rectifier constructed with controlled rectifier element, such as thyristors that rectifies the AC voltage applied from the rectifier transformer 3 into a variable DC voltage. Reference numeral 5 designates a load, such as a coil used in plasma position control for nuclear fusion, and is supplied current from the power supply system 100. Reference numeral 6 designates a capacitor and 7 designates a charger for charging the capacitor 6. Reference numeral 8 designates a switch that is constructed with an ignitron or a thyristor and 9 designates a diode device constructed with a serially connected diode.

Reference numeral 10 designates a DC current detector that detects a DC current flowing through the load 5 and 11 designates a voltage detector that detects a voltage across the capacitor 6. Reference numeral 12 designates a time delay circuit that receives a start-up command 51 for starting the power supply system 100 and delays the start-up command by a specified time period $t_d$, for example several mS. Reference numeral 13 designates a pulse generator that produces an ON pulse signal to the switch 8 in response to the output signal of the time delay circuit 12. Reference numeral 14 designates a calculation circuit that calculates a difference between a current reference value 52 and the output of the DC current detector 10. Reference numeral 15 designates an automatic current regulator that receives the output of the calculation circuit 14 and produces a third control signal 53 to be used for controlling the controlled rectifier 4 so that the load current flowing through the load 5 is equal to the current reference value 52. Reference numeral 16 designates a phase control circuit, 17 designates a pulse amplifier circuit and 18 designates a level detection circuit that receives the output of the voltage detector 11 and produces a bypass pair release command 54 when the voltage across the capacitor 6 becomes below a specified voltage $E_1$. Reference numeral 19 designates a potential transformer for detecting an AC voltage of the AC bus line 1.

The phase control circuit 16 receives the AC voltage of the AC bus line 1 through the potential transformer 19, the start-up command 51, the third control signal 53 from the automatic current regulator 15 and the bypass pair release command 54 from the level detection circuit 18. On reception of the start-up command 51, the phase control circuit 16 produces a first control signal for the bypass pair operation of the controlled rectifier 4, which will be applied through the pulse amplifier circuit 17 to the controlled rectifier elements that constitute a bypass pair of the controlled rectifier 4. When the phase control circuit 16 receives the bypass pair release command 54, it stops the first control signal and produces a second control signal for the normal firing control operation of the controlled rectifier 4 based on the third control signal 53 from the automatic current regulator 15. The first control signal and the second control signal are applied sequentially to the pulse amplifier circuit 17 as a control signal 55 of the phase control circuit 16, which is amplified in the pulse amplifier circuit 17 and is applied to the gates of the controlled rectifier elements of the controlled rectifier 4. The detailed construction of the phase control circuit 16 will be described later. Here the start-up command 51 is produced earlier than an instant at which the current is actually initiated to rise by the specified time period $t_d$ established by the time delay circuit 12. The specified voltage $E_1$ may be determined to a voltage smaller than the rated output voltage of the controlled rectifier 4.

Figure 2:
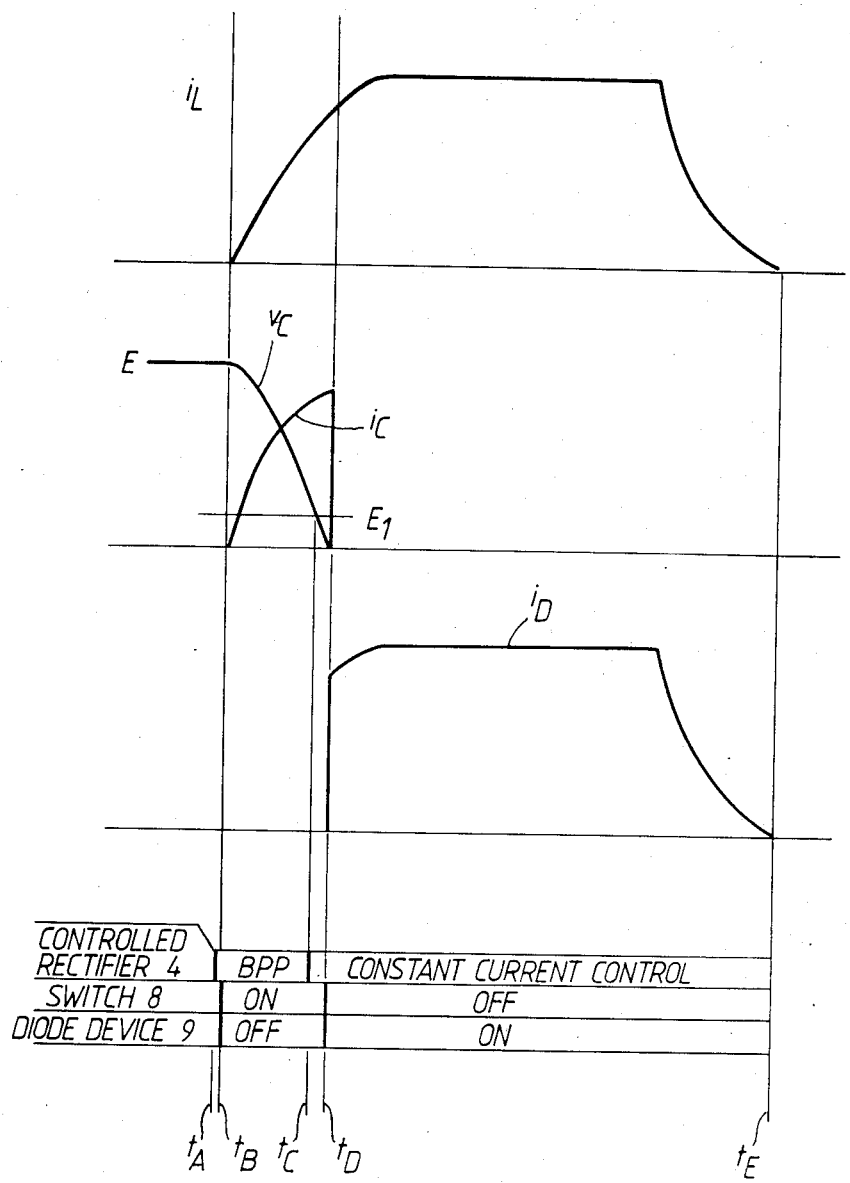
FIG. 2 is a waveform diagram for explaining the operation of the power supply system shown in FIG. 1.
Figure 3:
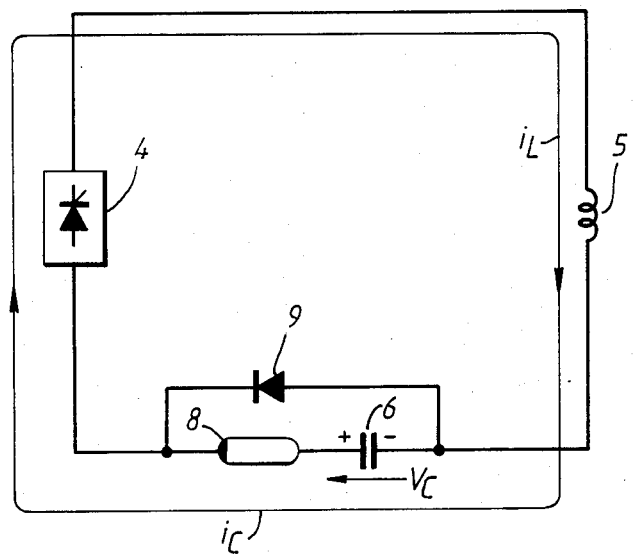
FIG. 3 and FIG. 4 are diagrams, illustrating the flow paths of a load current to explain the operation of the power supply system shown in FIG. 1, respectively.
Figure 4:
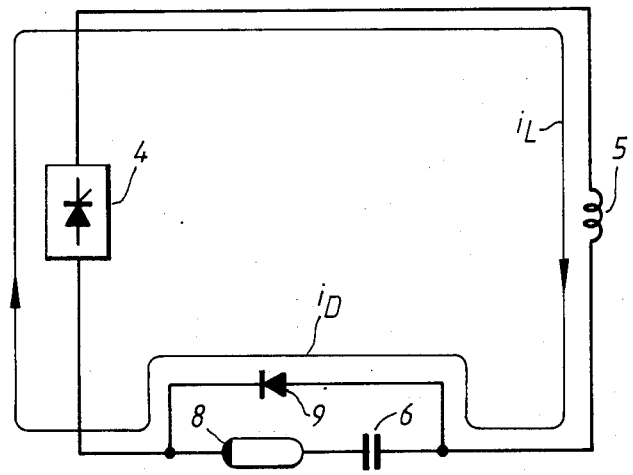

FIG. 2 is a diagram illustrating the relationship with respect to time of such parameters as a load current $i_L$ that flows through the load 5, a capacitor current $i_C$ that is discharged from the capacitor 6, a capacitor voltage $V_C$ across the capacitor 6 and a diode current $i_D$ that flows through the diode device 9. FIG. 2 also illustrates a timing chart of a control mode of the controlled rectifier 4, the states of the switch 8 and the diode device 9. In FIG. 2, BPP stands for bypass pair operation of the controlled rectifier 4, and indicates that firing pulses are fed to the controlled rectifier elements connected to the identical AC phases of the controlled rectifier 4 or that the corresponding controlled rectifier elements are in conduction state. FIG. 3 and FIG. 4 are diagrams, respectively, illustrating a flow path of a load current to explain the operation of the power supply system 100 shown in FIG. 1.

Figure 5:
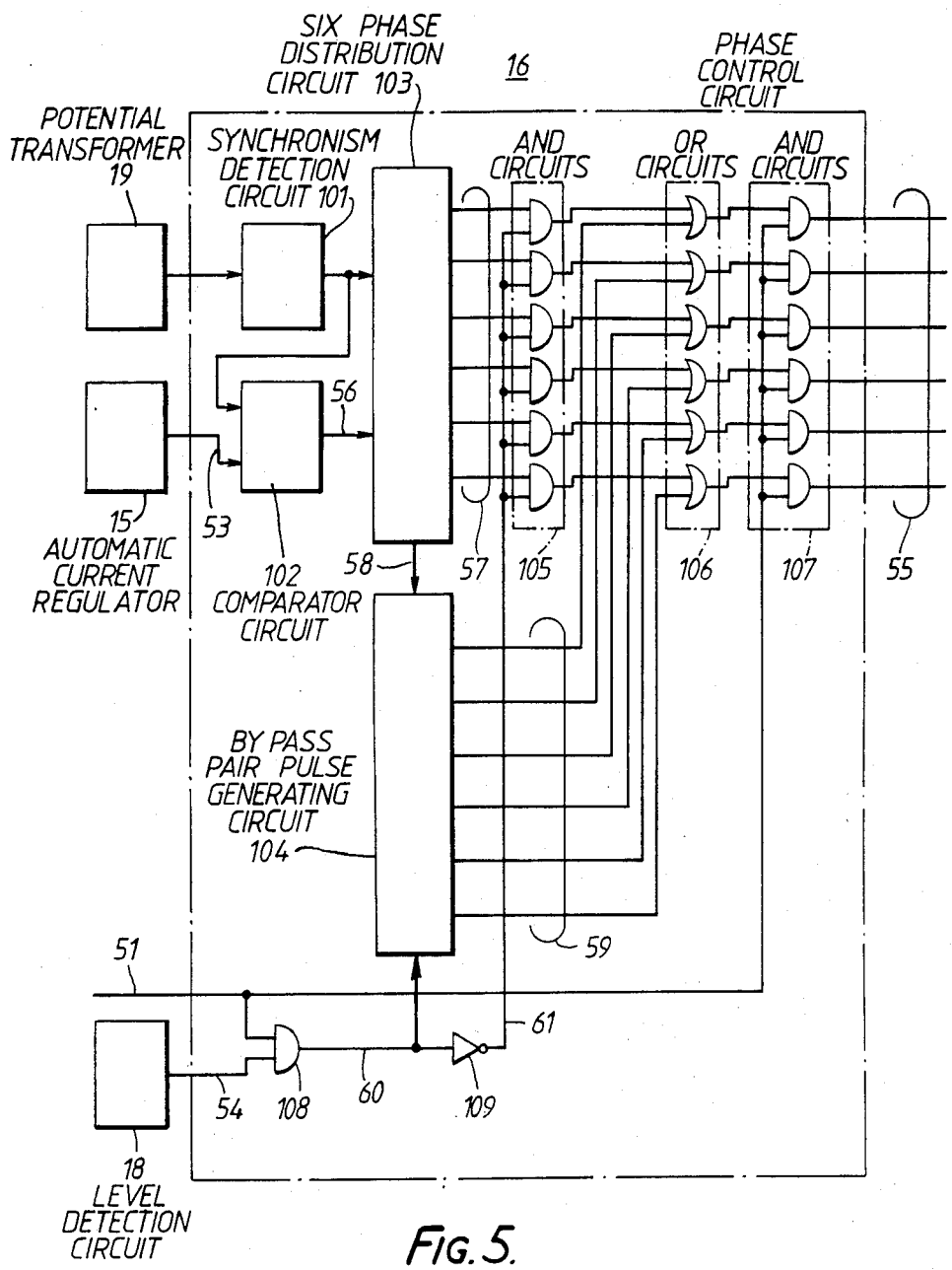
FIG. 5 is a block diagram illustrating a detailed construction of an example of the phase control circuit shown in FIG. 1.

Hereinafter the construction of the phase control circuit 16 will be described in detail with reference to FIG. 5. In FIG. 5, reference numeral 101 designates a synchronism detection circuit 101 that is connected to receive the AC voltage of the AC bus line 1 through the potential transformer 19 and detects a phase of the AC voltage. Reference numeral 102 is a comparator circuit that compares the phase of the AC voltage detected by the synchronism detection circuit 101 with the third control signal 53 from the automatic current regulator 15 and produces a timing signal 56 based on the comparison result. Reference numeral 103 designates a six phase distribution circuit for producing second pulses 57 so as to determine the firing phases and firing timings of the controlled rectifier elements in the controlled rectifier 4 based on the phase of the AC voltage and the timing signal 56. Reference numeral 104 designates a bypass pair pulse generating circuit that receives a signal 58 from the six phase distribution circuit 103 indicating the information that in which phases the firing pulses are generated, and produces first pulses 59 for the bypass pair operation for the controlled rectifier 4 when an output signal 60 of an AND circuit 108 is at "1" state. Reference numeral 105 designates AND circuits, 106 designates OR circuits, 107 designates AND circuits. The AND circuits 105, the OR circuits 106 and the AND circuits 107 are provided with six circuits, respectively, corresponding to six second pulses 57 of the six phase distribution circuit 103 and six first pulses 59 of the bypass pair pulse generating circuit 104. Reference numeral 109 designates a NOT circuit.

Hereinafter the operation of the phase control circuit 16 will be described. When the start-up command 51 is not generated and is at the "0" state, the control signal 55 of the phase control circuit 16 is not generated from the AND circuits 107. Before starting the power supply system 100, the voltage $V_C$ across the capacitor 6 is charged over the specified voltage $E_1$ and the bypass pair release command 54 is not generated from the level detection circuit 18, namely, the bypass pair release command 54 is at "1" state. Then the start-up command 51 is generated and becomes "1" state, the output signal 60 of the AND circuit 108 becomes "1" state and the output signal 61 of the NOT circuit 109 becomes "0" state. At this time, the second pulses 57 for current control are not outputted from the AND circuits 105. As the output signal 60 of the AND circuit 108 is at "1" state, the bypass pair pulse generating circuit 104 produces the first pulses 59 for bypass pair operation which are outputted through the OR circuits 106 and the AND circuits 107 as the control signal 55 of the phase control circuit 16. The controlled rectifier 4 starts bypass pair operation based on the control signal 55. When the voltage $V_C$ across the capacitor 6 becomes below the specified voltage $E_1$, the bypass pair release command 54 is generated and becomes "0" state, then the first pulses 59 are not generated from the bypass pair pulse generating circuit 104. As the output signal 61 of the NOT circuit 109 becomes "1" state, the second pulses 57 for current control are outputted through the AND circuits 105, the OR circuits 106 and the AND circuits 107 as the control signal 55 of the phase control circuit 16. Thus the controlled rectifier 4 has its firing timing controlled based on the control signal 55 and will be in current control operation.

Hereinafter, the operation of the power supply system 100 will be described in detail with reference to the drawings. Prior to feeding a current to the load 5, the capacitor 6 is charged in the polarity as shown in FIG. 1 by the charger 7. A charged voltage $E_C$ of the capacitor 6 is, in some cases, as large as five to several tens of times the rated output voltage of the controlled rectifier 4. The charged voltage $E_C$ is shared by the switch 8 and the controlled rectifier 4. Upon reception of the start-up command 51, the phase control circuit 16 produces the first pulses 59 as the control signal 55 which is applied to the controlled rectifier 4 through the pulse amplifier circuit 17 for the bypass pair operation at a time instant $t_A$ as shown in FIG. 2. After the specified time period $t_d$ determined by the time delay circuit 12 has elapsed, the switch 8 is caused to close by the ON pulse signal from the pulse generator 13 at a time instant $t_B$, so as to discharge the charge charged in the capacitor 6. As the controlled rectifier 4 is in bypass pair state at this time instant $t_B$, the discharge capacitor current $i_C$ flows through the switch 8 and the controlled rectifier 4 into the load 5. Then the capacitor 6 continues to discharge, and when the capacitor voltage $V_C$ becomes below the specified voltage $E_1$, the level detection circuit 18 produces the bypass pair release command 54 to the phase control circuit 16 at a time instant $t_C$. Upon reception of the bypass pair release command 54, the phase control circuit 16 produces the second pulses 57 as the control signal 55 which is applied to the controlled rectifier 4 through the pulse amplifier circuit 17. As a result, the controlled rectifier 4 is released from the bypass pair state and is operated in normal operation by means of the current control circuit 15. The capacitor 6 continues to discharge, and when the capacitor voltage $V_C$ reaches zero at a time instant $t_D$, the load current $i_L$ is commutated from the capacitor 6 to the diode device 9 and the switch 8 is opened. Thereafter a current control is performed through the diode device 9 by the controlled rectifier 4. FIG. 3 illustrates the flow path of the current during the time period ($t_B \sim t_D$) shown in FIG. 2. The load current $i_L$ flows through the capacitor 6, the switch 8 and the controlled rectifier 4. FIG. 4 illustrates the flow path of the current during the time period ($t_D \sim t_E$) shown in FIG. 2. Here the switch 8 is in the OFF state, so that the load current $i_L$ flows through the controlled rectifier 4 and the diode device 9.

In the power supply system 100 according to one embodiment of this invention, the capacitor 6, the charger 7 and the diode device 9 are provided corresponding to the diode rectifier in a conventional power supply system. Comparing the construction of the diode device 9 with that of the diode rectifier with the same rated output voltage, the diode device 9 is much simpler than the diode rectifier in construction. As for the charger 7, a small capacity charging device with ratings of, for example 10 kV or more and several amperes can be employed. Accordingly the power supply system 100 can be provided more economically than a conventional power supply system.

In the power supply system 100, in case that the load current $i_L$ is abruptly raised, such a current is supplied from the charge charged in the capacitor 6, so that the load current $i_L$ can be raised without any disturbance on the AC bus line 1. Further according to the embodiment, after the capacitor voltage $V_C$ has reached zero, the load current $i_L$ is commutated to the diode device 9, so that current control can be smoothly performed. Moreover, before initiating flow of the load current $i_L$, a bypass pair pulse is given to the controlled rectifier in advance, so that the load current $i_L$ can be raised immediately by closing the switch 8 at the time instant $t_B$, the specified time period $t_d$ after the start-up command 51 is given. As a result, the charging voltage $E_C$ of the capacitor 6 can be determined independently from the rated voltage of the controlled rectifier 4. Therefore, the charging voltage $E_C$ of the capacitor 6 can be determined higher, while the rated voltage of the controlled rectifier 4 can be determined lower, for example one kV, whereby a synthetically highly economical power supply system can be readily provided.

In the power supply system 100 according to the present invention, the waveform of the required load current $i_L$ determines the peak value of the capacitor discharge current $i_C$ and the time period ($t_B \sim t_D$) which is from the instant when the capacitor current $i_C$ initiates to flow to the instant when the capacitor current $i_C$ reaches its peak value. A capacitance value of the capacitor 6 is determined by the equation $(t_B \sim t_D) = (\pi/2)\sqrt{LC}$, where L represents an inductance value of the load 5 for example 10 mH. The charging voltage E is determined by the equation $i_{CP} = E\sqrt{C/L}$, where $i_{CP}$ represents the peak value of the capacitor discharge current $i_C$.

In the above-described embodiment, the diode device 9 is provided in parallel with a series circuit of the switch 8 and the capacitor 9. But this invention is not limited to this embodiment. A switch may be connected in series to the controlled rectifier 4, the load 5 and a parallel circuit of the diodes device 9 and the capacitor 6. In this case the switch is constructed such that it is closed by the ON pulse signal from the pulse generator 13 and is opened after the termination of supplying the load current $i_L$ to the load 5, for example after the time instant $t_E$ as shown in FIG. 2.

In the above-described embodiment, the time delay circuit 12 is provided which delays the start-up command 12 by the specified time period $t_d$. But this invention is not limited to this embodiment. Another circuit may be employed which causes the switch 8 to be closed after the controlled rectifier 4 becomes in the bypass pair operation state.

In the above-described embodiment, the voltage detector 11 and the level detection circuit 18 are provided to detect whether or not the first voltage across the capacitor is below the specified voltage $E_1$. But this invention is not limited to this embodiment. Once the circuit constant of the power supply system are determined, another circuit may be employed which detects indirectly the first voltage across the capacitor 6 from the discharge time constant of the capacitor 6 and calculates the time instant when the detected first voltage is equal to the specified voltage $E_1$.

As described above, this invention can provide a highly economical power supply system and a starting method thereof wherein a large load current can be raised with a quick response time without any disturbance on the AC bus line.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power supply system for supplying a load current to a load, comprising:
    control rectifier means having input and output terminals for receiving an AC voltage at said input terminals and for performing bypass pair operation and current control operation based on a control signal to supply said load current from said output terminals;
    first means having two terminals for charging a first voltage between said two terminals;
    switch means;
    said first means, said switch means and said output terminals of said control rectifier means being connected in series;
    second means, connected in parallel with one of said first means and a serially connected circuit of said first means and said switch means, for flowing said load current therethrough in one direction; and
    control circuit means, connected to receive a start-up command, said first voltage and said AC voltage, for producing an ON signal based on said start-up command, and for producing said control signal, based on said AC voltage and said start-up command, as a first control signal for bypass pair operation of said controlled rectifier means when said first voltage is larger than or equal to a specified voltage and a second control signal for current control operation of said controlled rectifier means when said first voltage is below said specified voltage, and for outputting said first control signal and said second control signal sequentially as said control signal;
    said switch means being closed based on said ON signal from said control circuit means, and
    said second means flowing said load current therethrough when said first voltage is a predetermined value.

2. The power supply system according to claim 1, wherein said control circuit means includes:
    calculation means for receiving a current reference value and a value indicative of said load current and for comparing said current reference value with said value of said load current to produce a difference signal based on the comparison result;
    current control circuit means connected to receive said difference signal for producing a third control signal so that said value of said load current is equal to said current reference value;
    ON signal generating means connected to receive said start-up command for producing an ON signal based on said start-up command;
    voltage detector means for detecting said first voltage of said first means;
    level detection means connected to receive said first voltage for comparing said first voltage with a specified voltage to produce a bypass pair release command based on the comparison result; and
    phase control circuit means, connected to receive said AC voltage, said third control signal, said start-up command and said bypass pair release command, for producing said control signal based on said AC voltage, said third control signal, said start-up command and said bypass pair release command.

3. The power supply system according to claim 2, wherein said phase control circuit means includes:
    six phase distribution circuit means connected to receive said AC voltage and said third control signal for generating six pulse signals based on said AC voltage and said third control signal so as to control said controlled rectifier means such that said value of said load current becomes equal to said current reference value;
    first control signal generating means connected to receive said AC voltage, said start-up command and said bypass pair release command for producing said first control signal based on said AC voltage and said start-up command when said bypass pair release command indicates that said first voltage is larger than or equal to said specified voltage;
    second control signal generating means connected to receive said six pulse signals, said start-up command and said bypass pair release command for producing said second control signal based on said six pulse signals and said start-up command when said bypass pair command indicates that said first voltage is below said specified voltage; and
    means for outputting said first control signal and said second control signal sequentially as said control signal.

4. The power supply system according to claim 2, wherein said ON signal generating means includes:
    time delay circuit means for delaying said start-up command by a specified time period to produce a delayed signal; and
    pulse generator means for producing said ON signal based on said delayed signal.

5. The power supply system according to claim 1, wherein said first means includes:
    a capacitor; and
    charger means for charging said capacitor.

6. The power supply system according to claim 1, wherein:
    said second means includes a serially connected diode.

7. The power supply system according to claim 1, wherein:
said second means is connected in parallel with said first means.

8. The power supply system according to claim 1, wherein:
said second means is connected in parallel with a serially connected circuit of said first means and said switch means.

9. The power supply system according to claim 1, wherein:
said controlled rectifier means includes a plurality of controlled rectifier elements.

10. The power supply system according to claim 1, wherein:
said second means flows said load current therethrough when said first voltage is zero.

11. A method for starting a power supply system for supplying a load current to a load including, controlled rectifier means having input and output terminals for receiving an AC voltage at said input terminals, first means having two terminals for charging a first voltage between said two terminals, and switch means, wherein said first means, said switch means and said output terminals to said controlled rectifier means are connected in series, said power supply system further including second means connected in parallel with one of said first means and a serially connected circuit of said first means and said switch means for passing said load current therethrough in one direction, comprising the steps of:
charging said first means initially by a specified charging voltage between said two terminals;
opening said switch means initially;
starting said controlled rectifier means then in bypass pair operation mode;
closing said switch means then, thereby to cause said first means to discharge;
releasing said controlled rectifier means from bypass pair operation mode and starting said controlled rectifier means in current control operation mode when said first voltage between said two terminals of said first means becomes below a specified voltage; and
commutating said load current through from said first means to said second means when said first voltage is a predetermined value.

* * * * *